Jan. 7, 1969    B. R. OBRA    3,420,566
VEHICLE CONVERSION

Filed Oct. 20, 1965    Sheet 1 of 2

INVENTOR.
BART R. OBRA
BY
J. R. Chisholm
ATTORNEY

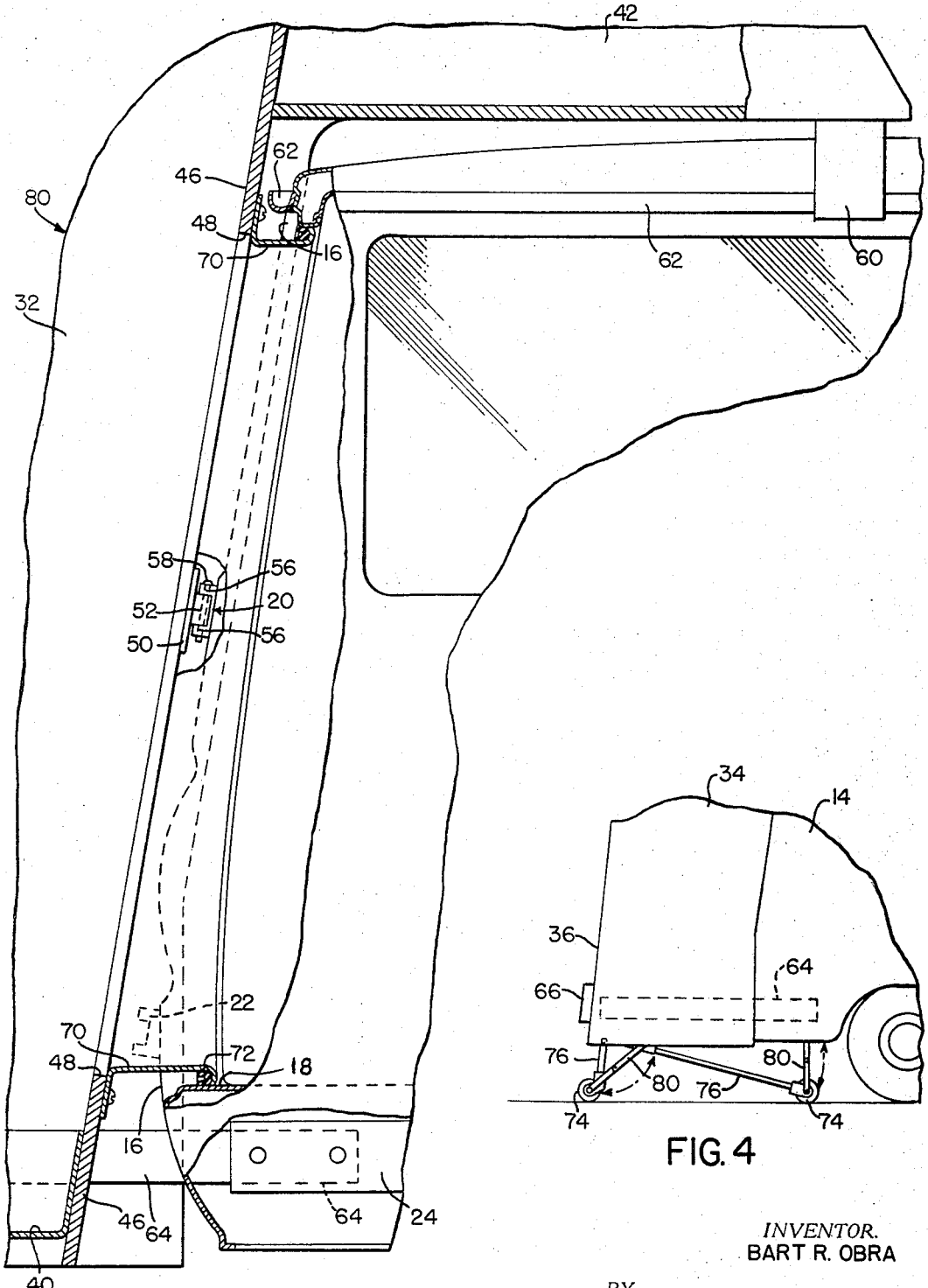

United States Patent Office 3,420,566
Patented Jan. 7, 1969

3,420,566
VEHICLE CONVERSION
Bart R. Obra, 22611 Detour, St. Clair
Shores, Mich. 48082
Filed Oct. 20, 1965, Ser. No. 498,853
U.S. Cl. 296—23       9 Claims
Int. Cl. B60p 3/34

ABSTRACT OF THE DISCLOSURE

A van type motor vehicle is enlarged to provide a camping vehicle having a kitchen by an attachment secured over the rear doorway by fastening to the standard door hinges of the vehicle. The attachment extends below the floor of the vehicle to provide full headroom. It is also attached to bumper brackets. The weight of the attachment is supported wholly by the hinges and bumper brackets, but the attachments may be steadied by a portion overhanging the roof and tied down to the gutter rails. The front wall of the attachment has an opening corresponding to the vehicle doorway, and is sealed to the doorway, by a sealing ring.

---

This invention relates to vehicles suitable for camping and particularly to such vehicles which can be used either for conventional utility and passenger transportation or can readily be converted into camping vehicles having passenger carrying space, passenger sleeping space, and a kitchen compartment or space for storing, preparing, and serving food.

For many years there has been a widespread enthusiasm for camping vehicles. This has included interest in attachments or adapters which can be added to existing standard utility or passenger vehicles to make them suitable for camping, and many forms of such devices have been made.

Many people have proposed additions to standard vehicles in the form of boxes, compartments, extensions and the like which theoretically, at least, can be attached to a standard vehicle so as to become part of the vehicle, in effect, and provide sleeping, kitchen or eating space. Such proposals are of three types.

(1) A box or compartment rests upon, but does not extend below, the tailgate of a station wagon, for example as in the Zentner Patent 3,185,518.

(2) A box or compartment is set into or upon the bed of a pickup truck such as shown in the Lee Patent 3,002,760.

(3) An attachment which fits on standard sedan type car, being disposed behind and on top of the car as illustrated by the Cook Patent 2,614,882 or the Bender Patent 3,288,517.

None of the devices which have come to my attention is completely satisfactory for converting a standard vehicle into a camping vehicle. In many cases one reason is that each particular camping addition which is intended to become part of the vehicle must be made to fit one vehicle model precisely. It cannot be transferred to another year or model of vehicle, and so cannot be produced in quantity interchangeably for a variety of standard vehicles.

Another reason is that none of such devices which have come to my attention can be entered while the vehicle is in motion, but must be entered from outside of the vehicle because they have no communication between the passenger compartment of the standard vehicle and the camping or kitchen compartment.

Another reason is that the attaching means for securing the camper to the vehicle are awkward, inadequate, or require modification of the vehicle so that the use of the vehicle for customary utility purposes or passenger transportation is interefered with or its appearance is impaired.

Another reason is that none of these proposed devices which have come to my attention are constructed so that they extend vertically below the standard floor of the vehicle, if there is such a floor. Therefore it is impossible to provide a kitchen compartment having full head room without increasing the height of the attachment and consequently the height of the vehicle to an awkward or unsafe amount. This is illustrated in the Bender patent and the McFarland Patent 3,288,519.

It is one of the objects of my invention to provide an improved non-collapsible camper or camping attachment which can be mass produced in substantially identical specimens which can readily be adapted to fit a variety of standard vehicles, particularly but not necessarily standard van-type vehicles.

Another object of the invention is to provide an improved camping attachment for standard vehicles which can be readily attached and detached and can be mounted securely on the vehicle by simple and efficient fastenings, and without modification of the vehicle.

Another object of the invention is to provide an improved camper having full stand-up headroom which can be entered conveniently from both the cargo space or passenger carrying space of a standard vehicle and from outside the vehicle.

More specifically it is an object to provide such full headroom by a convenient and compact attachment which extends below the standard floor of the vehicle, especially of a van type vehicle.

Another object is to provide improved means for connecting the camper to the vehicle which provides an effective weather-tight seal.

Another object is to provide improved means for transporting and leveling the camper for attachment to the vehicle.

These and other objects of the invention will be apparent from the following description and from the annexed drawings in which:

FIG. 3 is a fragmentary enlarged section on the plane indicated by the line 3—3 of FIG. 1, and FIG. 4 is a side elevation of the lower part of the camping attachment, secured to the vehicle and provided with adjustable jacks.

Figure 1:
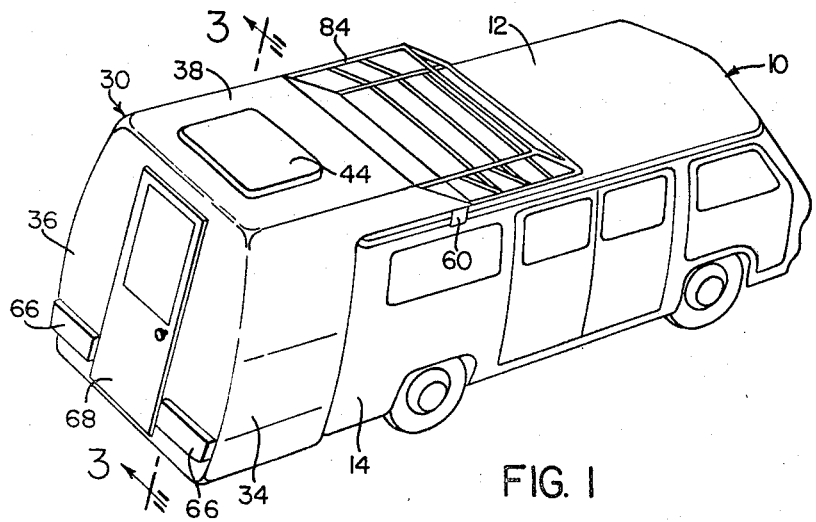
FIG. 1 is a perspective view of a camping vehicle embodying one form of my invention.
Figure 2:
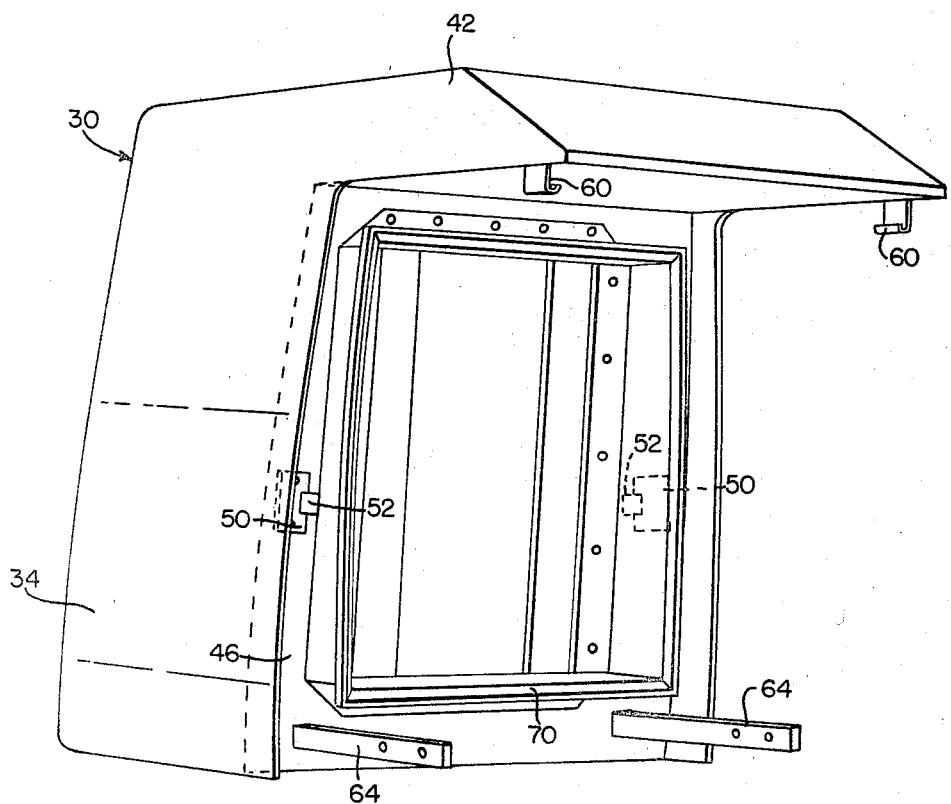
FIG. 2 is a perspective view of a camping compartment separated from the vehicle and including an adapter for fitting the compartment for a variety of vehicles.

In FIG. 1, 10 designates as a whole a standard commercial van-type motor vehicle having the usual passenger and cargo compartment determined by a roof 12, side walls 14 and a back end surface 16 (FIG. 3) surrounding the customary door opening for receiving a pair of doors (not shown) each mounted on a pair of upright hinges 20 and 22 at one side of the door opening. The vehicle may include a frame represented by 24 in FIG. 3, or the frame may be an integral part of the body as is known. Such vehicles are of standard commercial construction and so well known that further description of the vehicle is not needed.

The invention includes a kitchen attachment or camper 30, which I call a papoose, signifying that it is hung on the back. This is generally of the form of an inverted L-shaped box having a main compartment 32 determined by side walls 34, a rear wall 36, a roof 38 and a floor 40.

The compartment 32 is designed to provide full standing height between the floor 40 and the roof 38 and the roof extends over the roof 12 of the vehicle and far enough above it to provide a storage compartment 42 which may have a water tank or any desired storage space. The compartment 32 is designed to contain a stove, refrigerator, sink, and storage shelves distributed on either side of a central stand-up space. It may have a roof hatch 44 for ventilation.

Referring to FIG. 3, the front wall 46 of the papoose is provided with an opening 48 which substantially matches the opening 18 in the rear of the cargo compartment of the vehicle from which opening 18 the usual doors have been removed by removing the customary pins from the hinges 20 and 22. The opening 48 provides convenient access to the papoose from the cargo and passenger space of the van.

Attached to the front wall 46 is a pair of hinge halves 50 having hinge sleeves or tubes 52 which fit between the supporting sleeves or tubes 56 of the standard hinges of the van when the papoose is in place, to help support the weight of the papoose. The papoose is secured to the van by standard hinge pins 58 inserted in the sleeves 52 and 56. It is further steadied and secured to the van by roof clamps 60 secured to the extension 42 in tension and hooked under the customary gutter molding 62 of the van. It is further steadied and supported by bumper brackets 64 secured to the frame 24 and passing through or alongside the compartment 32 to the back wall 36 where bumpers 66 are attached to the bumper brackets. Before the papoose is attached the customary bumper and bumper brackets are removed from the van so that the brackets 64 can be bolted to the frame in their place.

The papoose may have a back door 68 closing any suitable opening in the back wall which in general is aligned with and corresponds with the openings in the front wall of the papoose and the rear end of the van. This provides access from outside the vehicle.

In order to seal against weather the connection between the papoose and the van I provide a tubular adapter or flange 70 secured around the opening 48 and extending into the opening 18 in which it is sealed by any suitable gasket or O-ring 72 which fits around the floor and walls of the opening 18.

In practice I propose to make one papoose and to provide a number of interchangeable sleeves, the rear end of each of which fits the papoose and the front end of which fits some one standard van. When the papoose is to be mounted the sleeve which fits that van is selected and attached to the papoose as shown in FIG. 3.

In order to facilitate removal and attachment of the papoose it is provided with one or more folding adjustable jacks by which the papoose can be raised to the exact height for mating of the hinge parts 52 and 56 and can be wheeled to and away from the van. These jacks may be constructed as indicated in FIG. 4, for example, and include wheels 74 journalled on supporting hinged or pivoted arms 76 held in place by toggle struts 80 which can be adjusted in any well known manner not shown to determine the height of the papoose above the ground. When the papoose has become attached the jacks are folded out of the way.

If desired any suitable luggage rack 84 may be attached to the roof of the van or to the front of the extension 42 or both.

The papoose described above provides a convenient and efficient way of converting a standard vehicle into a comfortable living or camping vehicle. The attachment or detachment can be quickly made, and does not require permanent modification of the vehicle to the slightest degree. All that is required is to knock the hinge pins out of the doors, set the doors aside, remove the bumper and brackets and substitute the papoose for the doors and bumper. The floor of the papoose can be at the minimum height for ground clearance, much lower than the floor of the vehicle. The roof of the papoose extends above the roof of the vehicle just enough to provide full headroom, which automatically provides useful storage space without unduly increasing the height of the vehicle.

While the particular form of my invention, which has been described above for illustration only, is a preferred form, the invention is not limited either to the description or drawing, but extends to the constructions which are embraced by the terms of the following claims.

I claim as my invention:

1. In a camping vehicle, the combination of a conventional van type motor vehicle which has a frame and passenger space defined in part by a roof, floor, side walls, and a rear doorway in a back end surface; conventional door hinge members having upright sleeves secured to the back end surface; a camper compartment adapted to be entered from the passenger space and having a back wall extending below the floor, a front wall conforming generally to the back end surface of the vehicle and extending below the floor said front wall having an opening commensurate with and opposite the vehicle doorway, a back wall having an opening extending below the front wall opening, supporting sleeves on the front wall cooperating with the hinge sleeves to support the compartment vertically on the vehicle, an extension of the compartment over-lying the roof, a door in the rear wall opening of the compartment and floor extending between the front and back walls of the compartment below the level of the vehicle floor; an adapter fixed to the front wall and in sealing engagement with the vehicle; pins for securing the supporting sleeves to the hinge sleeves; tension brackets on the extension securing the extension to the roof; bumper brackets supporting the lower portion of the compartment on the frame, the bumper brackets extending from front to back of the compartment; a bumper behind the compartment secured to the bumper brackets; and at least one adjustable roller jack for supporting the compartment on the ground and aligning the supporting sleeves with the hinge sleeves.

2. In a camping vehicle, the combination of a conventional van type motor vehicle which has a frame and cargo space defined in part by a roof, floor, side walls, and a rear doorway in a back end surface and has conventional door hinge members having upright sleeves secured to the back end surface; a camper compartment adapted to receive food-preparing and serving equipment and having a back wall extending below the floor, a front wall conforming generally to the back end surface of the vehicle and extending below the floor said front wall having an opening commensurate with and disposed opposite the vehicle doorway, a back wall having an opening extending below the front wall opening, supporting sleeves on the front wall cooperating with the hinge sleeves to support the compartment vertically on the vehicle, an extension of the compartment over-lying the roof, a door in the rear wall opening of the compartment, and a floor extending between the front and back walls of the compartment below the level of the vehicle floor; pins securing the supporting sleeves to the hinge sleeves; tension brackets on the extension securing the extension to the roof; brackets supporting the lower portion of the compartment on the frame, and at least one adjustable roller jack for supporting the compartment on the ground and aligning the supporting sleeves with the hinge sleeves.

3. In a camping vehicle, the combination of a conventional van type motor vehicle which has cargo space defined in part by a roof, floor, side walls, and a rear doorway in a back end surface; conventional door hinge members having pivot members secured to the back end surface; a camper compartment adapted to receive food-preparing and serving equipment and having a back wall extending below the floor, a front wall conforming generally to the back end surface of the vehicle and extending below the floor said front wall having an opening commensurate with an disposed opposite the vehicle doorway, the back wall having an opening extending below the front wall opening, supporting members on the front wall cooperating with the pivot members to support the compartment vertically on the vehicle, an extension of the compartment for over-lying the roof, a door in the rear wall opening of the compartment, and a floor extending between the front and back walls of the compartment below the level of the vehicle floor; an adapter fixed to the front wall for sealing engagement with the vehicle; tension brackets on the extension securing the extension to the roof; bumper brackets supporting the lower portion of the compartment on the vehicle below the level of the vehicle floor, the bumper brackets extending from front to back of the compartment; and a bumper behind the compartment secured to the bumper brackets.

4. In a camping vehicle the combination of a conventional van type motor vehicle which has a frame and cargo space defined in part by a roof, floor, side walls, and a rear doorway in a back end surface; conventional door hinge members having upright pivot elements secured to the back end surface; a camper compartment adapted to receive food-preparing and serving equipment and having a back wall extending below the floor of the vehicle and having a front wall conforming generally to the back end surface of the vehicle and extending below the floor of the vehicle, said front wall having an opening commensurate with and disposed opposite the vehicle doorway, and a floor extending between the front and back walls below the level of the floor of the vehicle; and supporting elements on the front wall cooperating with the pivot elements to support the compartment vertically on the vehicle; and brackets supporting the lower portion of the compartment on the frame.

5. In a camping vehicle the combination of a conventional van type motor vehicle which has a frame and cargo space defined in part by a roof, floor, side walls, and a rear doorway in a back end surface, and has conventional door hinge members having upright pivot elements secured to the back end surface; a camper compartment and having a back wall extending below the level of the floor of the vehicle and having a front wall conforming generally to the back end surface of the vehicle and extending below the level of the floor of the vehicle, said front wall having an opening commensurate with and disposed opposite the vehicle doorway, and a floor extending between the front and back walls of the compartment below the level of the vehicle floor; supporting elements on the front wall cooperating with the pivot members to support the compartment vertically on the vehicle; an extension of the compartment over-lying the roof; and tension brackets on the extension for securing the extensions to the roof.

6. In a camping vehicle, the combination of a conventional van-type motor vehicle which has cargo space defined in part by a roof, floor, side walls, and a rear doorway in a back end surface; conventional door hinge members having upright pivot members secured to the back end surface; a camper compartment adapted to receive food-preparing and serving equipment and having a back wall extending below the floor of the vehicle and having a front wall conforming generally to the back end surface of the vehicle and extending below the floor said front wall having an opening commensurate with and disposed opposite the vehicle doorway, and a floor extending between the front and back walls of the compartment below the level of the vehicle floor; supporting members on the front wall for cooperating with the pivot members to support the compartment vertically on the vehicle, and an adapter fixed to the front wall for sealing engagement with the vehicle.

7. In a camping vehicle the combination of a conventional van type motor vehicle which has cargo space defined in part by a roof, floor, side walls, and a rear doorway in a back end surface which doorway is defined by surfaces extending longitudinally of the vehicle; conventional door hinge members having upright pivot members secured to the back end surface; a camper compartment adapted to receive food-preparing and serving equipment and having a back wall extending below the floor of the vehicle and having a front wall conforming generally to the back end surface of the vehicle and extending below the floor of the vehicle said front wall having an opening commensurate with and disposed opposite the vehicle doorway and a floor extending between the front and back walls of the compartment below the level of the vehicle floor; supporting members on the front wall for cooperating with the pivot members to support the compartment vertically on the vehicle; and an adapter fixed to the front wall for sealing engagement with the vehicle, said adapter being insertable in the doorway and having a sealing edge for engagement with said longitudinally extending surfaces of the doorway.

8. In a camping vehicle the combination of a conventional van type motor vehicle which has passenger space defined in part by a roof, side walls, and a rear doorway in a back end surface which doorway is defined by surfaces extending lengthwise of the vehicle; a camper compartment adapted to be entered by a person from inside the vehicle and having a front wall conforming generally to the back end surface of the vehicle and extending below the level of the vehicle floor, said front wall having an opening commensurate with and disposed opposite the vehicle doorway; means below the floor of the vehicle for supporting the front wall, and means above the floor for detachably supporting the front wall on the vehicle, and an adapter fixed to the front wall for sealing engagement with the vehicle.

9. In a camping vehicle the combination of a conventional van type motor vehicle which has cargo space defined in part by a roof, side walls, and a rear doorway in a back end surface defined by surfaces extending lengthwise of the vehicle; a camper compartment adapted to receive food-preparing and serving equipment and having a front wall conforming generally to the back end surface of the vehicle and extending below the level of the floor of the vehicle, said front wall having an opening commensurate with and disposed opposite the vehicle doorway; means below the level of the floor for supporting the front wall; means above the level of the floor for detachably supporting the front wall on the vehicle; and an adapter fixed to the front wall for sealing engagement with the vehicle said adapter being insertable in the doorway and having a sealing edge for engagement with the longitudinally extending surfaces of the doorway.

References Cited

UNITED STATES PATENTS

| 3,288,519 | 11/1966 | McFarland | 296—23 |
| 3,288,517 | 11/1966 | Bender | 296—23 |
| 2,407,007 | 9/1946 | Henrichsen | 180—79.2 |
| 3,002,760 | 10/1961 | Lee | 296—23 |
| 3,185,518 | 5/1965 | Zentner | 296—23 X |
| 2,841,094 | 7/1958 | Schumacker | 280—415.3 X |

FOREIGN PATENTS 963,781   7/1964   Great Britain.

PHILIP GOODMAN, *Primary Examiner.*

U.S. Cl. X.R.

280—415

UNITED STATES PATENT OFFICE
CERTIFICATE OF CORRECTION

Patent No. 3,420,566

January 7, 1969

Bart R. Obra

It is certified that error appears in the above identified patent and that said Letters Patent are hereby corrected as shown below:

Column 5, line 34, after "compartment" insert -- adapted to receive food-preparing and serving equipment --.

Signed and sealed this 21st day of April 1970.

(SEAL)
Attest:

Edward M. Fletcher, Jr.
Attesting Officer

WILLIAM E. SCHUYLER, JR.
Commissioner of Patents